United States Patent [19]
Flaherty et al.

[11] Patent Number: 5,146,568
[45] Date of Patent: Sep. 8, 1992

[54] REMOTE BOOTSTRAPPING A NODE OVER COMMUNICATION LINK BY INITIALLY REQUESTING REMOTE STORAGE ACCESS PROGRAM WHICH EMULATES LOCAL DISK TO LOAD OTHER PROGRAMS

[75] Inventors: James E. Flaherty, Framingham; Alan Abrahams, Hudson, both of Mass.

[73] Assignee: Digital Equipment Corporation, Maynard, Mass.

[21] Appl. No.: 240,955

[22] Filed: Sep. 6, 1988

[51] Int. Cl.⁵ .................. G06F 13/14; G06F 15/16
[52] U.S. Cl. .................. 395/325; 364/236.2; 364/242.94; 364/260; 364/280.2; 364/284.4; 364/940.62; 364/952.1; 364/975.1; 364/975.2; 364/976; 364/978; 364/DIG. 1
[58] Field of Search ............... 364/300, 200 MS File, 364/900 MS File; 379/269

[56] References Cited

U.S. PATENT DOCUMENTS

| | | | |
|---|---|---|---|
| 3,634,830 | 1/1972 | Baskin | 340/172.5 |
| 4,138,718 | 2/1979 | Toke et al. | 364/900 |
| 4,145,739 | 3/1979 | Dunning et al. | 364/200 |
| 4,590,556 | 5/1986 | Berger et al. | 364/200 |
| 4,663,707 | 5/1988 | Dawson | 364/200 |
| 4,663,707 | 5/1987 | Dawson | 364/200 |
| 4,724,521 | 2/1988 | Carron et al. | 364/300 |
| 4,853,875 | 8/1989 | Brown | 364/200 |
| 4,885,770 | 12/1989 | Croll | 379/269 |

OTHER PUBLICATIONS

IBM Technical Disclosure Bulletin, vol. 26, No. 108, Mar. 1984, p. 5609 New York, US; P. E. Milling; "Remote IPL of Diskette-Driven Computers".
IBM Technical Disclosure Bulletin, vol. 13, No. 5, Oct. 1970, p. 1203, New York, US; B. B. Young et al.: "Remote Initial Program Load and Library Maintenance for Satellite Computers".
"The MS-DOS Encyclopedia", 1988, pp. 61-82, article 2, Microsoft Press, Redmond, Wash., US.
IBM Technical Disclosure Bulletin, vol. 27, No. 1B, Jun. 1984, pp. 481-482 New York, US; D. J. Bradley et al.: "Feature Extensions for IBM Personal Computer" European Search Report, Application No. EP 89 30 2132.
Digital Equipment Corporation, DECnet Digital Network Architecture, Phase IV, Maintenance Operations, Functional Specification, Order No. AA-X436A-TK, Dec. 1983, Digital Equipment Corporation, Maynard, Mass.
"Accessing Files on Emulated PC Disks at a Host Computer" IBM Technical Disclosure Bulletin vol. 28, No. 6 Nov. 1985 2752-4.

Primary Examiner—Thomas C. Lee
Assistant Examiner—Ken S. Kim
Attorney, Agent, or Firm—Fish & Richardson

[57] ABSTRACT

A system and method of down loading, over a network, operating systems or other executable programs to a computer which does not have a boot device or other device containing the executable program. Down loading is accomplished without modification of the loadable image. The computer has a network interface which requests a minimum-boot program be transferred from a host computer on the network. The minimum-boot program, when executed, establishes a logical connection to a disk server on the network and allows the requesting computer to treat the disk server as a local boot device.

4 Claims, 6 Drawing Sheets

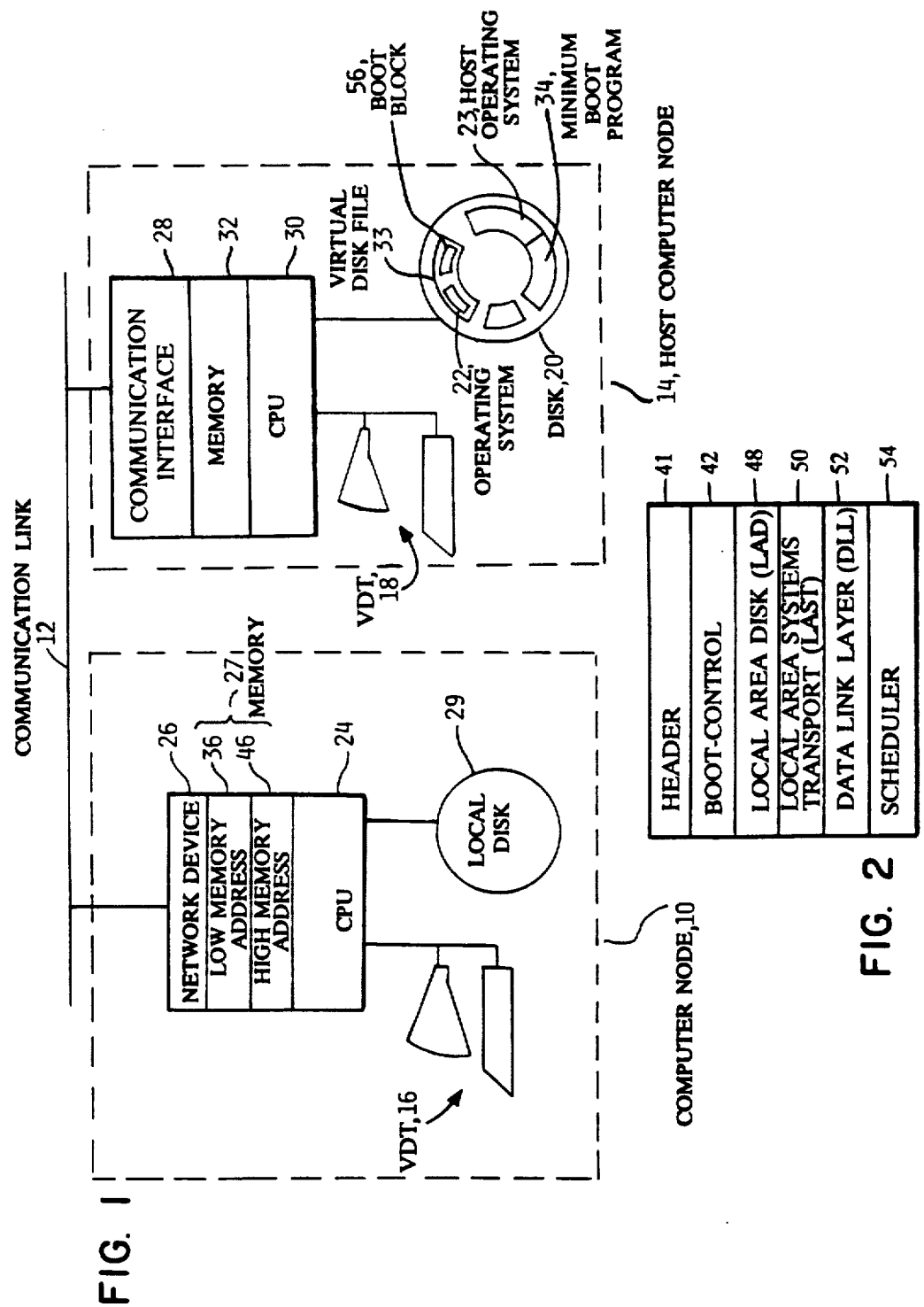

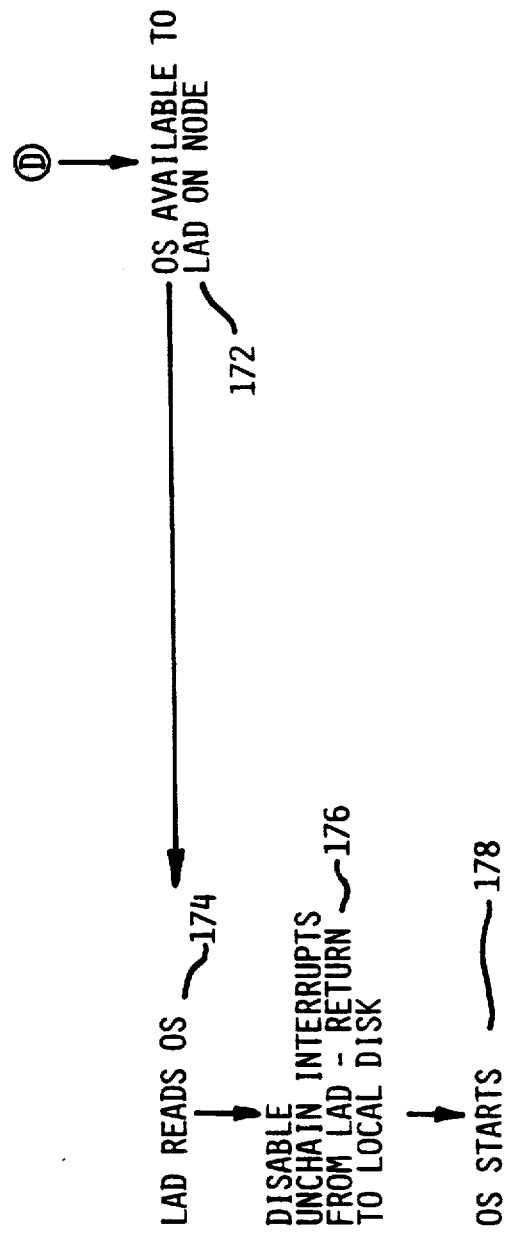

REMOTE BOOTSTRAPPING A NODE OVER COMMUNICATION LINK BY INITIALLY REQUESTING REMOTE STORAGE ACCESS PROGRAM WHICH EMULATES LOCAL DISK TO LOAD OTHER PROGRAMS

BACKGROUND

A computer includes both a physical machine, namely the hardware, and the instructions which cause the physical machine to operate, namely the software. Software includes both application and system programs. If the program is simply to do tasks for a user, such as solving specific problems, it is referred to as application software. If a program controls the hardware of the computer and the execution of the application programs, it is called system software. System software further includes the operating system, the program which controls the actual computer or central processing unit (CPU), and device drivers which control the input and output devices (I/O) such as printers and terminals.

A general purpose computer is fairly complicated. Usually there will be a queue of application programs waiting to use the central processing unit. The operating system will need to determine which program will run next, how much of the CPU time it will be allowed to use and what other computer resources the application will be allowed to use. Further, each application program will require a special input or output device and the application program must transfer its data to the operating system which controls the device drivers.

The operating system is generally too large and complex to be stored in non-volatile Read Only Memory (ROM). Additionally, there are generally periodic changes made to the operating system which makes it impractical to store it in ROM. The operating system is usually stored on a magnetic disk and read into Random Access Memory (RAM) to be executed. The problem is that the access to the disk requires the disk hardware driver and the rest of the system software. It would therefore appear that there is no mechanism to start the computer, since to read the operating system off the disk requires that the operating system be present.

To get around this problem a technique called bootstrapping or booting is used. In booting, a small program is provided in a special ROM, called the boot-ROM. When the computer is first started, the contents in the boot-ROM are read and that program executed. The boot-ROM program is a small program which instructs the CPU where on a disk to find a larger boot program, which is termed the "boot-block" program. It also instructs the CPU how to load the program into memory and execute it. The boot-block program is executed to copy the operating system off the disk. Once the operating system is in memory, it is executed and the computer is completely functional.

A network of general purpose computers may be constructed by having a number of general purpose computers, termed nodes, communicate with one another over a communications link. If the computers are distant from each other, the network is termed a wide area network (WAN), while, if they are close together, for example, in the same building, it is called a local area network (LAN). In one type of LAN, each computer or node is connected to a common communication link by way of an interface, called a network device.

The computers in a network communicate by sending messages to each other. Each message consists of a header field, which contains an identifier which comprises the address of the network device of the computer to which the message is directed and an identifier which comprises the address of the network device of the computer sending the message, and a data field, which contains the information being sent between the computers.

Each network device monitors the messages on the link and copies the message from the link into the computer's memory and notifies the computer if the message header contains the network device's address or if a message header includes a broadcast address, indicating that the message is being sent to all devices on the network or a multicast address, indicating that the message is being sent to all devices within a certain address range. When a computer wishes to transmit information to another computer, it attaches the address of the intended recipient to its own address and attaches both to the information to form a message, which is transmitted over the communication link.

The availability of local area networks has added to the versatility of computers. It did not take users long to realize that the network could make files on disks belonging to one computer system on the network available to all computers on the network. Programs were developed which simplified access to the files on the disks of another computer system. Eventually the concept evolved to assign special functions to certain computers on the network. For example, one computer would assign logical name to each physical device accessible to the network. In that way a user instead of requesting a file on a specified disk on a specified system can simply request the file using some logical name, and a computer on the network which was designated to do the correlation then requests the file on the specified disk and system, treating the disk on that system as if it were the user's local disk. This translation of logical names to physical devices is transparent to the user. The computer doing the translating in this case is termed a disk or file server. Other server functions have been defined, such as a print server, which allows a file to be printed without specifying to which computer the printer is attached.

It is also possible to assign a user to a disk and then use the disk server to connect that user to that disk regardless of what computer on the LAN the user is on. A disk server program, termed a Local Area Disk (LAD), allows a user on one computer to treat a file on a disk on another computer as a virtual disk. This virtual disk acts as if it were a disk on the user s computer.

One of the files which can be accessed across the network are the operating system files. In fact, even before the LAD concept made the access to a file easy, many systems were developed to "downline" load an operating system to a computer on the network. It became unnecessary, therefore, that the computer, which is receiving the operating system, have an operating system on a disk or have a disk at all. For such a system to function, there are only two requirements. The first is that the network device be capable of generating a message and transmitting it over the communications link to request the operating system from another computer on the network. The second is that the network device be capable of loading the operating system it received into memory and causing the CPU to execute it.

In one prior arrangement, upon powering on the computer, the network device transmitted a request to be booted. This request, broadcast to all the other computers on the network, includes a simple message which contains the network device s hardware address. A computer on the network, upon receiving this request, checks its database to determine if it contains a listing identifying an operating system for the requesting computer. If the receiving computer finds the list entry of the requesting computer in its database, it becomes the host computer and retrieves the requested operating system from its disk, attaches the requesting computer's address to the file to form a message, and transmits the message on the network.

The requesting computer receives the message copies it into its memory, and initiates the operating system execution. Although in principle the loading of an operating system into a computer on the network is simple to understand, its actual implemention is fairly complex.

To go into more detail, upon powering on, the requesting computer performs a self-test/power-up sequence. As part of the sequence, the processor looks for a boot device. If it fails to find a boot device, the processor will allow the network device to request a boot over the network.

Typically, the network device will not use the protocols usually used to communicate between computers. The reason for this is that such protocols are more complex than is necessary for such a simple task, and the network device would have to support a great deal of functionality it would not need. So instead, a simple protocol is used which consists of a small set of specialty messages for performing, testing, making boot requests, etc. (see for example DECnet TM Digital Network Architecture Maintenance Operations Functional Specification, order number (AA-x436A-TK DIGITAL EQUIPMENT CORPORATION, MAYNARD, MASS). The boot request message, for example, might simply contain the code number for a boot request, the code number for the type of device making the request, what type of computer the request is for, and whether the program requested is a boot strap program or the operating system program. To these codes the network device of the requesting computer attaches its address, and an address indicating this is a broadcast to all other computers on the network.

When another computer on the network receives this message, it takes the hardware address of the message and looks through its list of computers for which it has operating system programs. If it fails to find the hardware address of the requesting computer listed in its database, the receiving computer simply ignores the message. If no computer has responded to the requesting computer within a certain amount of time, the requesting computer will again transmit a boot request. If the receiving computer finds the address of the requesting computer listed in its database, it then determines whether the requesting systems operating system is to be loaded immediately or in a series of steps.

The problem with this method of loading an operating system using the network is that too much information must be contained within the network prior to the boot request. That is, a computer node on the network needs to know, a priori, what programs, including bootprograms and operating system, each bootable network computer on the network would require. Further, for the operating system to work with the boot-programs, it is necessary that the operating system be modified to contain "hooks" or entry points that the boot-programs can call.

SUMMARY OF INVENTION

The invention provides a new and improved system and method of downloading operating system or other executable programs to a computer on a network without a boot device and without requiring a modification of the loadable image.

Upon power up, the network device requests a boot and a minimum-boot program is transferred over the network into the requesting computer s memory. This minimum-boot program contains the functionality necessary to establish a network connection to a disk server on the network. When chained into the power-up/self-test program of the requesting computer, the minimum-boot program causes the computer to function as though it has a local disk with an operating system image, while actually transmitting all the disk accesses made by the computer across the network. Because the network is treated like a disk, there is no need to modify the operating system for downline loading.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIG. 1 is block diagram of a system constructed in accordance with the invention including a host system and a node to be booted;

FIG. 2 is a block diagram of the minimum boot program structure.

FIG. 3a–3e together is a step diagram of the boot procedure.

DESCRIPTION OF AN ILLUSTRATIVE EMBODIMENT

Figure 3A:
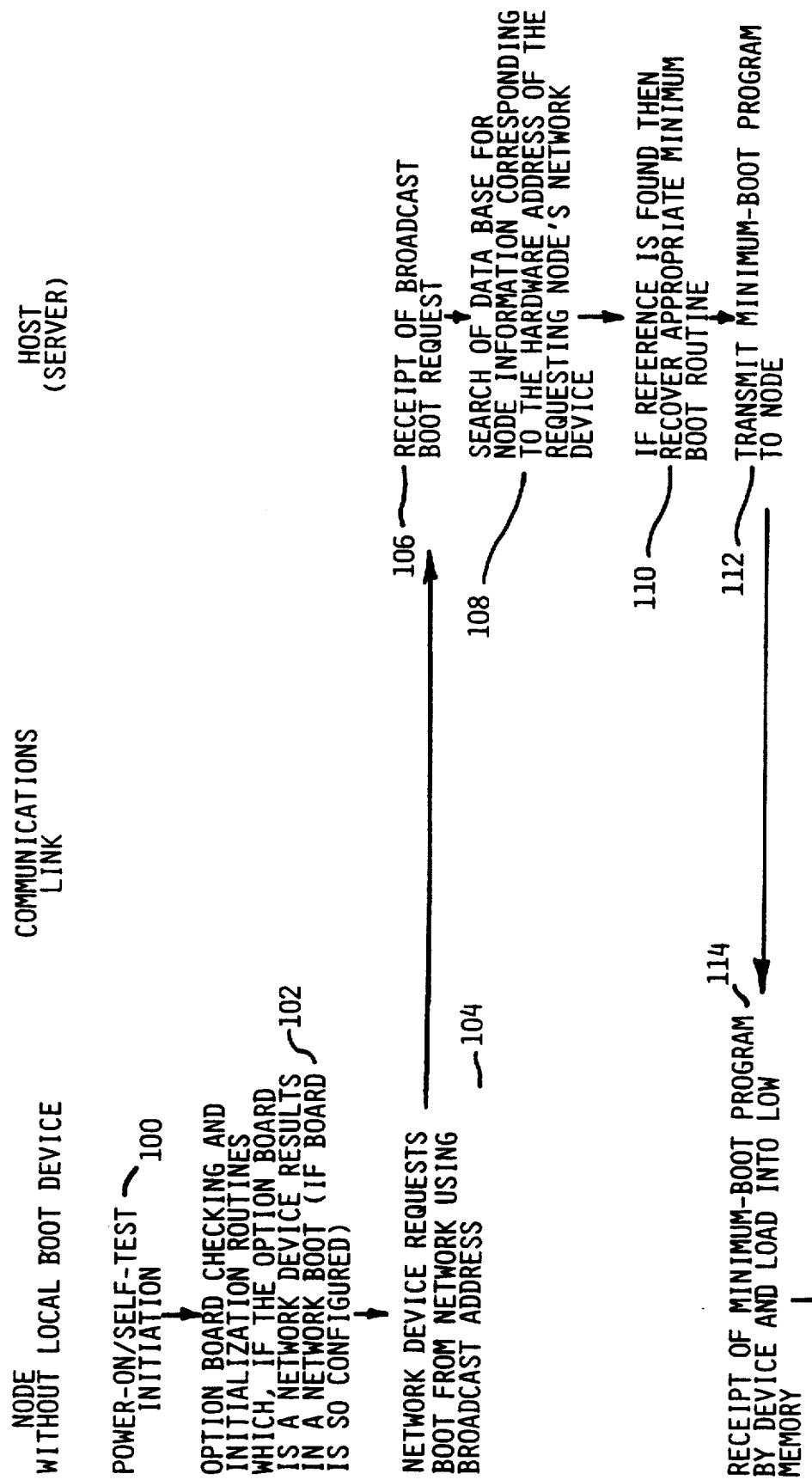

FIG. 1 depicts a network consisting of a computer node 10, which does not include a local boot device, and a computer host node 14, which has a disk 20 containing the operating system of node 10, connected by a communications link 12. The node 10 has a communications interface, called the network device 26 by which it transmits and receives messages on the communications link 12. Similarly, node 14 has a communications interface 28.

The node 10 has many of the elements of an ordinary computer, such as a memory 27 and a central processing unit (CPU) 24. In addition it may have peripheral devices such as a video display terminal 16 and a local disk storage device 29.

The host 14 also has the elements of a computer including a CPU 30 and a memory 32 as well as peripherals such as a video display terminal 18 and a disk 20. The disk 20 on the host 14 not only contains the host's operating system 23 but also a minimum-boot program 34 needed to load the node 10 and a virtual disk file 33 containing the operating system 22 for node 10.

Upon powering up, the processor 24 of computer 10 executes a power-on/self-test sequence during which it attempts to find a boot device which contains a file with its operating system in it. If it finds no boot device, the network device 26 broadcasts a request for an operating system over the network communications line 12. The network device 28 on the host 14 determines that the message is in broadcast mode and notifies the CPU 30.

The CPU 30 of host 14 determines that the message is a boot request and searches its memory 32 to attempt to identify an operating system for the node 10. If it finds such an identification, it constructs a message by attaching the hardware address of the network device 26 of node computer 10 onto a minimum-boot program file 34 and places the message on the communications line 12.

The communications device 26 of the node 10 receives the message and copies the minimum boot program into the node's low memory addresses 36 of its memory 27. The CPU 24 then begins to execute the minimum boot program. The minimum-boot program is then copied into the high addresses 46 of memory 27 and the power-on/self-test sequence completes.

At this point the software on the node 10 is essentially treating the file 33 on disk 20 on host 14 as its virtual local disk. The node 10 reads a boot-block 56 from the virtual disk file 33 on disk 20 and uses it to load its operating system 22. It is important to note that all this is taking place over the network link 12 and not through access of the node's 10 local disk storage 29.

To understand the sequence of events in detail, it is first necessary to consider the nature of the minimum-boot program. The minimum-boot program, shown in FIG. 2, consists of a header 41 which identifies it as a network program to the host s operating system. The next portion is a boot-control program 42 which will prepare the node 10 for the downline load. A Local Area Disk (LAD) portion 48 is a program which allows a file on a disk on the network to be treated as a virtual local disk by node 10. A Local Area Systems Transport (LAST) 50 provides the actual local area network communications functions as described in co-pending application entitled "LOCAL AREA SYSTEM TRANSPORT" By Bruce E. Mann Et al. Attorney docket No. PD 88-0421. A Data Link Layer (DLL) 52 is the protocol providing the mechanism for communications between nodes through the network device 26 on node 10 and network device 28 on node 14. Finally, a Scheduler program 54 provides the real-time scheduling and timers required by network communications.

Figure 3B:
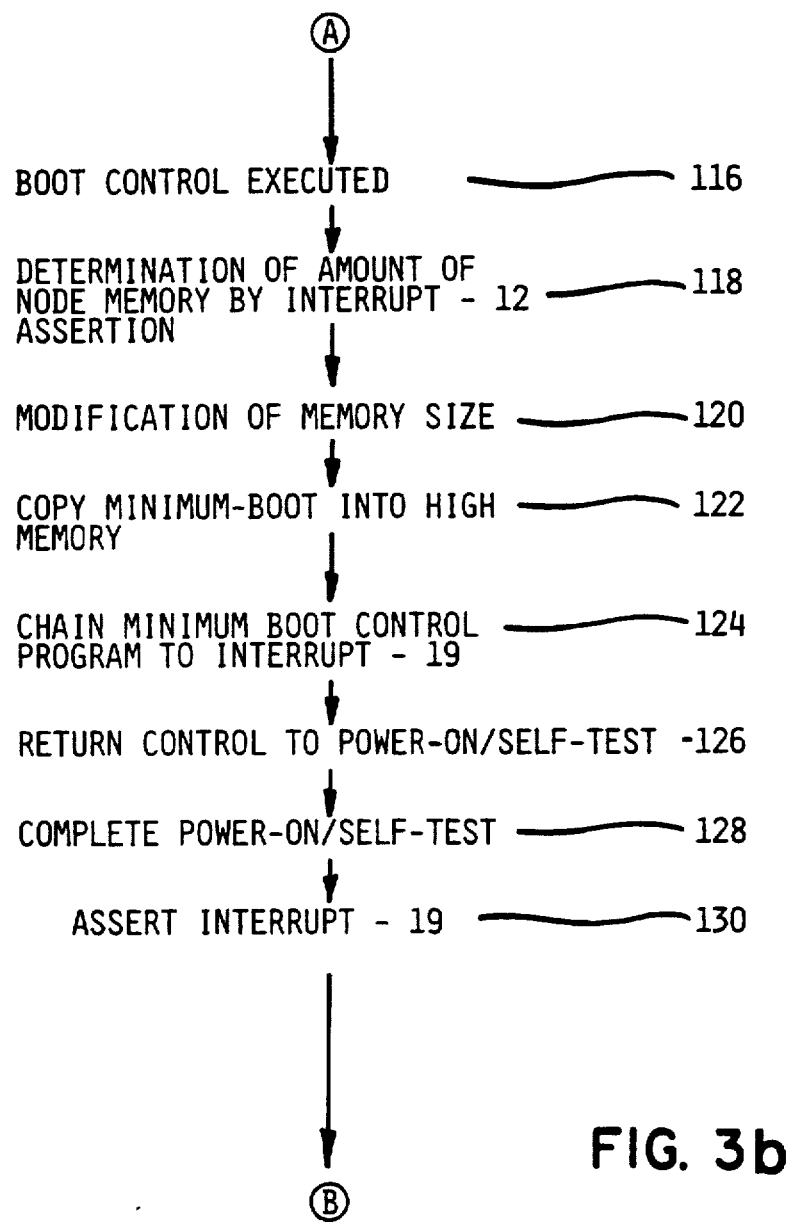
Figure 3C:
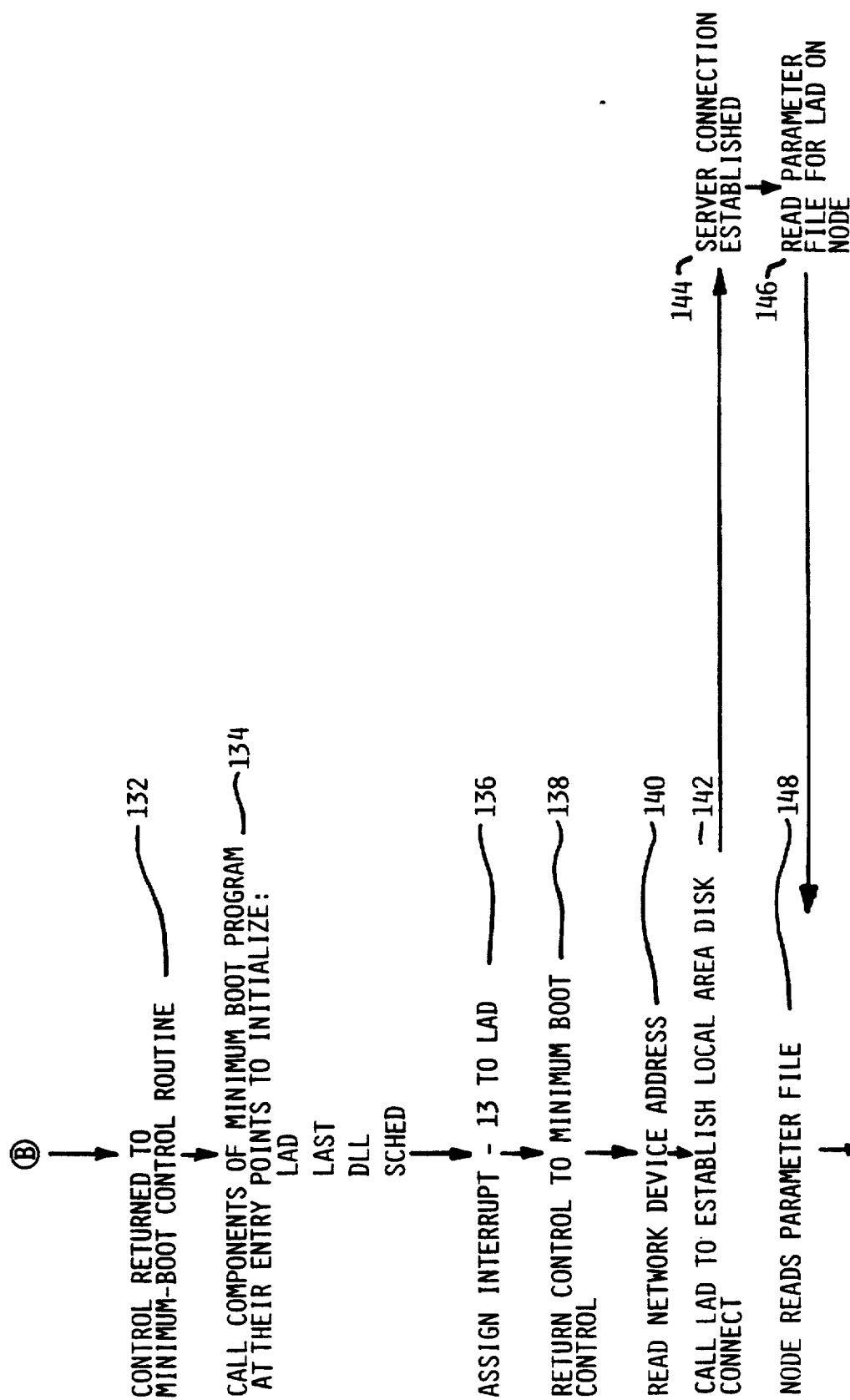
Figure 3D:
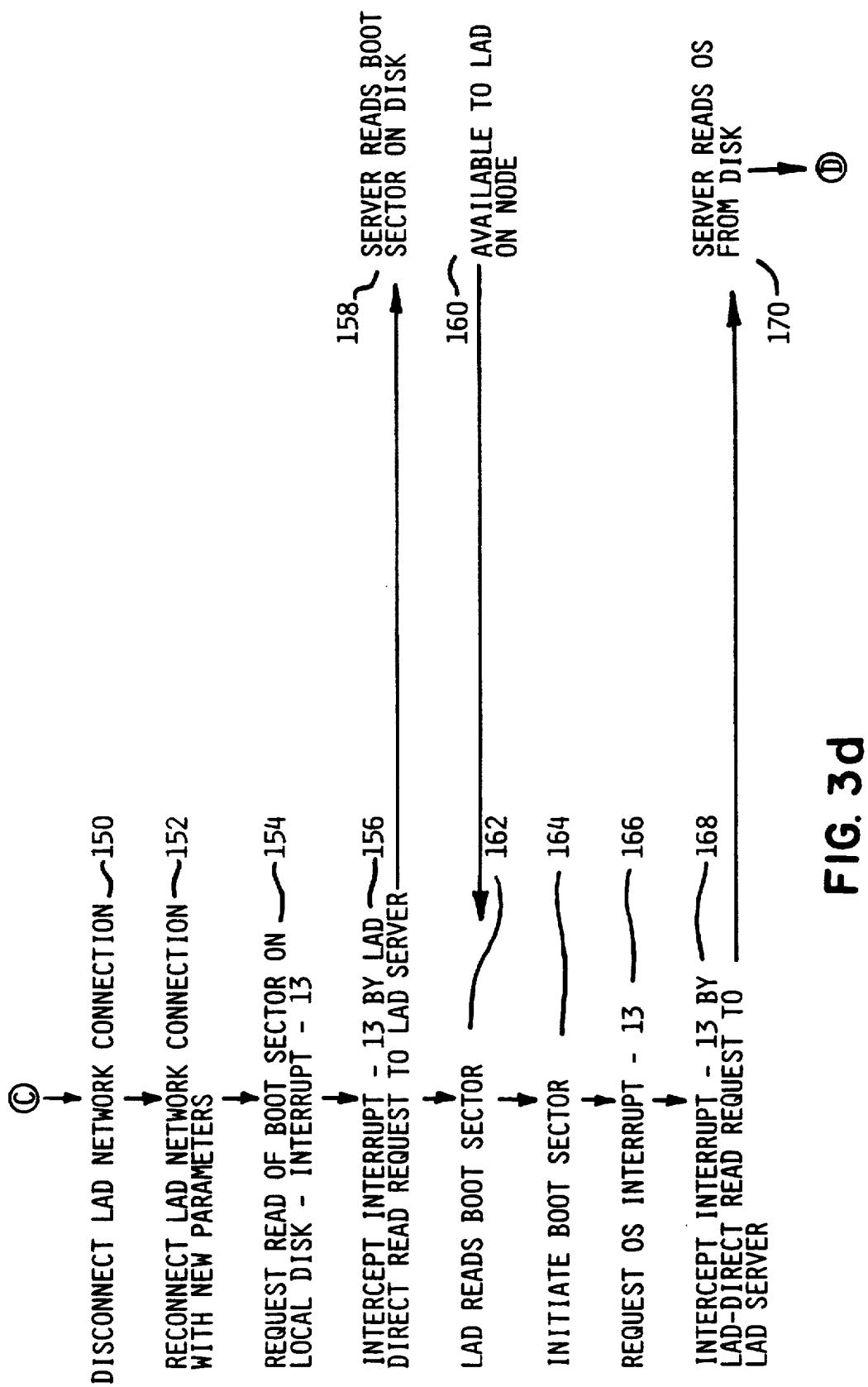

FIG. 3 shows in detail the steps performed by node 10 and host 14 during a downline load of the operating system for node 10. To the left of the figure are the steps performed by the node 10 and to the right are the steps performed by the host 14. Transfers between the two over the communications link 12 are shown in the center of the figure. The direction of the arrows indicates the direction of message flow.

With reference to FIGS. 1, 2, and 3, when the computer 10 is powered on, it initiates a power-on/self-test (Step 100). During the power-on/self-test, the CPU 24 checks addresses on the bus to determine if an option board is present on the system. If it finds an option board, it processes any initialization routines located on the board. When the option board is network device 26, the initialization routines (Step 102) on the device requests a boot from the network by broadcasting a boot request (Step 104). Another computer 14 on the network receives (Step 106) the boot request and searches (Step 108) its database for information concerning the requesting node 10. If the requesting node 10 is in the database, the appropriate minimum boot routine is recovered (Step 110) from disk 20 and transmitted (Step 112) to the requesting node 10.

Upon receipt (Step 114) of the minimum boot routine by node 10, it copies it into low memory 36 and executes it (Step 116) in particular the boot control program 42.

The minimum boot-control program 42 of the minimum-boot routine first determines (Step 118) the amount of memory 27 on node 10. In one embodiment, in which node 10 includes an IBM compatible personal computer, this is accomplished by initiating an interrupt 12 interrupt service routine. The boot-control 42 modifies (Step 120) the memory size reported by subtracting the size of the minimum boot program (FIG. 2) from the memory size returned by interrupt-12 in a location in memory. This is done to make this portion of memory unavailable to the node 10. The minimum boot routines are copied (Step 122) into high memory 46, and the boot control is chained (Step 124) to a routine which enables a boot block to be read from a local disk. This is done to allow the power up/self test sequence to complete and to regain control upon its completion.

The power-up/self-test sequence regains (Step 126) control upon completion of the network device 26 initialization routines and completes (Step 128). Upon completion, the power-up/self-test sequence attempts (Step 130) to read the boot block on the local disk. In this embodiment in which node 10 includes an IBM compatible personal computer, this is accomplished by initiating an interrupt 19 interrupt service routine. This causes the boot-control routine 42 to regain control (Step 132). The boot-control routine 42 calls (Step 134) the LAD program 48, the LAST program 50, the DLL program 52 and the Scheduler 54 at their entry points to initialize them. In this embodiment in which node 10 includes an IBM compatible personal computer, any disk access request generates an interrupt 13. LAD is chained to interrupt 13 so that any disk access request will be intercepted by LAD (Step 136).

The boot-control program 42 regains (Step 138) control, and enables the registers of the network device 26 to be read (Step 140) to determine the network address of node 10. The boot-control program 42 calls (Step 142) the LAD program 48 to establish a local area disk connection. Once the local area disk connection is established with server (Step 144), the virtual disk is available to the node. Once the local area disk connection has been established, the communications parameters may in fact, be changed. For example, in one embodiment, shown in FIGS. 3C and 3D, it is at this time that the DECnet network parameters for the node 10, such as a network address, are read (Step 146) by the server so that the LAD routine 48 on the node 10 can be used to read (Step 148) the parameter file. Once the parameters are read, the LAD connection is broken (Step 150) and re-establshed (Step 152) using the new LAD parameters. In the general case where the communication parameters need not be changed, steps 146, 148, 150, and 152 need not be not taken and the node 10 continues with the boot procedure by requesting a read of boot-sector 56 to be retrieved.

The boot control program (42) issues a read request for the boot-sector 56 (Step 154). In one embodiment, in which node 10 includes an IBM compatible personal computer, this is accomplished by asserting interrupt 13. Since the LAD program 48 is chained in the interrupt service routine (Step 136) it intercepts this request and directs (Step 156) it, to the host 14. This host 14 reads (Step 158) the boot-sector 56 on the disk 20 and allows the node 10 to read it (Step 160). LAD 48 on the node 10 then exchanges messages (Step 162) with host 14 that facilitates the transfer of boot-sector 56 to node 10, and its execution (Step 164).

The boot-sector 56 enables the node 10 to request the operating system by asserting Step 166 interrupt-13 which is again intercepted by LAD 48 and directed (Step 168) to the server. The server reads (Step 170) the operating system from file 33 on disk 20 and makes it available (Step 172) to DAD 48 on node 10. LAD 48 allows node 10 to read (Step 174) the operating system 22 and load it into memory 27. When all the operating system is loaded, LAD is unchained from interrupt-13 (Step 176) from LAD and returned to the local disk 29. Control is transferred to the initialization code of the executable program or operating system (Step 178).

It should be stated that in this embodiment the host and the server were indicated to be the same node 14. This is not a requirement, and it is possible to have another implementation in which they are separate.

It must be noted that none of the steps of the downline load of the operating system required that the operating system be modified in any way. By treating the host disk as if it were the local disk, any executable image may be loaded without modification.

Having shown the preferred embodiment, those skilled in the art will realize many variations are possible which will still be within the scope and spirit of the claimed invention Therefore, it the intention to limit the invention only as indicated by the scope of the claims.

What is claimed is:

1. A method of downline loading an executable bootstrapping image from a host computer over a communications link to a node, said node having an interface through which it communicates over said communications link, comprising the steps of
    initiating execution by said node of a node initialization program,
    after said initiation, requesting a remote storage access program by sending one of a small set of specialty messages over said communications link, and retrieving by said node said remote storage access program from the host over the communications link,
    execution of said retrieved remote storage access program to link said remote storage access program to a local storage interrupt service routine,
    in response to a local storage interrupt service request, execution by said node of said linked remote storage access program to emulate a local physical disk, send a message over said communications link to establish a communication session, said communication session permitting a protocol that is more complex than permitted by said set of specialty messages over said communications link, and initiate retrieval of an executable bootstrapping image over the communications link from a file on the host, by using the emulated local physical disk after the establishing of said communication session, and
    execution by said node of said retrieved executable bootstrapping image.

2. The method of claim 1 further including the step of re-establishing access to a local physical disk.

3. The method of claim 1 or 2 wherein said node has a memory having an address space which extends from a low address value to a high address value and in which said node, following the request of said remote storage access program, thereafter:
    loads said remote storage access program into said memory at a portion of said address space proximate said low address space,
    determines the size of said memory on said node,
    loads in a memory size interrupt service location a new memory size value equal to the memory size minus the size of the remote storage access program, and
    copies said remote storage access program into said memory at a portion of said address space proximate said high address value.

4. The method of claim 3 wherein the determining of the amount of memory on said node comprises the steps of:
    generating a request memory size interrupt service request, and
    reading a value returned in said memory size interrupt service location.

* * * * *

UNITED STATES PATENT AND TRADEMARK OFFICE
CERTIFICATE OF CORRECTION

PATENT NO. : 5,146,568
DATED : September 8, 1992
INVENTOR(S) : Flaherty et al

It is certified that error appears in the above-indentified patent and that said Letters Patent is hereby corrected as shown below:

On the title page, Item [56] Reference Cited deleted "4,663,707 5/1988 Dawson 364/200". add —4,752,870 6/1988 Matsumura 364/200".

Column 7, lines 6 "DAD" should be —-LAD—-.

Signed and Sealed this

Thirty-first Day of May, 1994

Attest:

BRUCE LEHMAN

Attesting Officer

Commissioner of Patents and Trademarks